Patented Dec. 2, 1941

2,264,400

UNITED STATES PATENT OFFICE 2,264,400

CROTYLIDENE DIUREAS AND PROCESS FOR MAKING THEM

Karl Ott, Munich, and Karl Hamann, Krefeld-Uerdingen, Germany, assignors, by mesne assignments, to Plaskon Company Incorporated, Toledo, Ohio, a corporation of Delaware No Drawing. Application December 29, 1938, Serial No. 248,238. In Germany December 31, 1937

9 Claims. (Cl. 260—553)

This invention relates to condensation products and a process for the manufacture of the same.

According to this invention a urea can be combined with crotonaldehyde or its homologs to form new valuable condensation products. The new compounds can as a rule be crystallised and exhibit no higher molecular weight than calculated according to their composition.

Among the homologs of crotonaldehyde suitable for the purpose of this invention may be mentioned for example the α-methyl crotonaldehyde, the α,γ-dimethyl croton aldehyde or α,γ-diethyl crotonaldehyde. Instead of urea itself, other ureas for example thiourea or monomethyl urea, monoethyl urea, monopropyl urea, monophenyl urea, asym. dimethyl urea, asym. diethyl urea or asym. dipropyl urea can be employed.

The condensation is most preferably carried out in the presence of water and with the addition of an acid, for example hydrochloric acid, sulphuric acid, phosphoric acid, formic acid, acetic acid, oxalic acid and tartaric acid. The best yields are obtained by the condensation of a urea with crotonaldehyde or a homolog thereof at a hydrogen ion concentration of the aqueous solution which corresponds to a pH-value between about 0 and about 4.5 and especially between about 1.5 and about 4.5.

The temperature of the reaction may vary according to the conditions. We have obtained good results at temperatures from about 0° to about 100° C. especially from about 50° to about 100 C.

The compounds obtained may be employed for example for the production of synthetic resins of the urea aldehyde type by condensation with aldehydes such as formaldehyde in the manner known in the art.

The following examples illustrate the invention; but the invention is not restricted to these examples. The parts are by weight:

Example 1

120 parts of urea are dissolved at 60° C. in 110 parts of water with the addition of 5 parts of 32% aqueous hydrochloric acid. Into this solution are allowed to flow 70 parts of crotonaldehyde, whereby the temperature rises to 90–95° C. By this means a white crystalline precipitate separates. The whole is maintained for 75 minutes longer at this temperature. After the cooling of the solution the condensation product is filtered off and dried. It has been produced by interaction of 2 mols of urea with 1 mol of crotonaldehyde with the elimination of 1 mol of water.

Analysis found: C=41.8%  H=7.0%  N=32.3%
Calculated for $C_6H_{12}O_2N_4$:
C=41.9%  H=7.0%  N=32.6%

The melting point is 250–252° C. The yield amounts to 132 parts of crotylidene diurea.

The same compound is obtained when instead of hydrochloric acid 15 parts of anhydrous formic acid are employed in the above batch.

Example 2

60 parts of urea are dissolved at 60° C. in 60 parts of water and 50 parts of ethyl alcohol with the addition of 10 parts of 20% aqueous hydrochloric acid. Into this solution are allowed to flow with 20 minutes at a temperature of 60–70° C. 42 parts of α-methyl crotonaldehyde. The whole is boiled for 5 hours under stirring. After cooling the solid condensation product is filtered off and dried. The melting point is about 245° C. The condensation product is the α-methyl crotylidene diurea, as the following analysis shows:

Analysis found: C=45.4%  H=7.5%  N=29.9%
Calculated for $C_7H_{14}O_2N_4$:
C=45.2%  H=7.5%  N=30.1%

Example 3

60 parts of urea are dissolved at 60° C. in 60 parts of water and 50 parts of ethyl alcohol with the addition of 10 parts of 20% aqueous sulphuric acid. Into this solution are allowed to flow within 20 minutes at a temperature of 60–70° C. 63 parts of α,γ-diethyl crotonaldehyde. The whole is boiled for 5 hours under stirring. After cooling the solid condensation product is filtered off and dried. It is the α,γ-diethyl crotylidene diurea. The melting begins at about 230° C. under decomposition.

We claim:

1. Process which comprises reacting with an aldehyde selected from the group consisting of crotonaldehyde and a higher homolog of crotonaldehyde upon a urea selected from the class consisting of urea, N-lower alkyl ureas, N-phenyl urea and thiourea in the presence of water with the addition of an acid.

2. Process which comprises reacting with an aldehyde selected from the group consisting of crotonaldehyde and a higher homolog of crotonaldehyde upon a urea selected from the class consisting of urea, N-lower alkyl ureas, N-phenyl urea and thiourea in an aqueous solution of a pH-value between about 0 to about 4.5.

3. Process which comprises reacting with one mol of crotonaldehyde upon two mols of urea in the presence of water with the addition of formic acid.

4. Process for the manufacture of α-methyl crotylidene diurea which comprises reacting with one mol of α-methyl crotonaldehyde upon two mols of urea in the presence of water and ethyl alcohol with the addition of hydrochloric acid.

5. Process for the manufacture of diethyl crotylidene diurea which comprises reacting with one mol of α,γ-diethyl crotonaldehyde upon two mols of urea in the presence of water and ethyl alcohol with the addition of sulphuric acid.

6. Material selected from the group consisting of crotylidene-diurea and a diurea of a higher homolog of croton aldehyde.

7. Crotylidene diurea consisting of white crystals melting between about 250° and about 252° C.

8. α-Methyl crotylidene diurea a solid compound melting at about 245° C.

9. α,γ-Diethyl crotylidene diurea a solid compound melting under decomposition over about 230° C.

KARL OTT.
KARL HAMANN.